(12) United States Patent
Cox et al.

(10) Patent No.: US 10,852,826 B1
(45) Date of Patent: Dec. 1, 2020

(54) SYSTEMS AND METHODS FOR STRAIN RELIEF IN A WEARABLE APPARATUS

(71) Applicant: Facebook Technologies, LLC, Menlo Park, CA (US)

(72) Inventors: Brian Cox, Seattle, WA (US); Genevieve Walker, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/257,828

(22) Filed: Jan. 25, 2019

Related U.S. Application Data

(60) Provisional application No. 62/736,491, filed on Sep. 26, 2018.

(51) Int. Cl.
    *G06F 3/14* (2006.01)
    *G06F 3/01* (2006.01)
    *G02B 27/01* (2006.01)
    *A41D 19/00* (2006.01)

(52) U.S. Cl.
    CPC ............. *G06F 3/014* (2013.01); *G06F 3/016* (2013.01); *A41D 19/0024* (2013.01); *G02B 27/01* (2013.01); *G06F 2203/013* (2013.01)

(58) Field of Classification Search
    CPC .... G06F 3/014; G06F 3/016; G06F 2203/013; G02B 27/01; A41D 19/0024
    See application file for complete search history.

(56) References Cited

U.S. PATENT DOCUMENTS

| | | | |
|---|---|---|---|
| 6,701,296 B1* | 3/2004 | Kramer | A61B 5/6806 370/545 |
| 2014/0366299 A1* | 12/2014 | Blake, II | D05B 93/00 15/209.1 |
| 2016/0363997 A1* | 12/2016 | Black | G06F 3/016 |
| 2018/0279951 A1* | 10/2018 | Asnis | A61B 5/6804 |

* cited by examiner

*Primary Examiner* — Lisa S Landis
(74) *Attorney, Agent, or Firm* — FisherBroyles, LLP

(57) ABSTRACT

The disclosed apparatus may include (1) a deformable material that is dimensioned to conform to a body part of a user and configured to stretch in at least one direction, (2) a transducer coupled to the deformable material, (3) a conduit that extends along the deformable material in the at least one direction and that couples the transducer to a control system, and (4) stitching in the deformable material that restricts the deformable material from stretching farther than the conduit is configured to extend. Various other systems and methods are also disclosed.

20 Claims, 6 Drawing Sheets

810
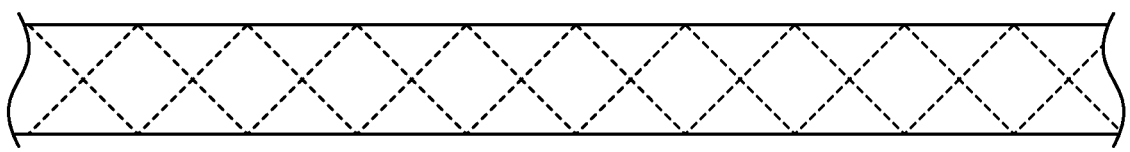
FIG. 8A
820
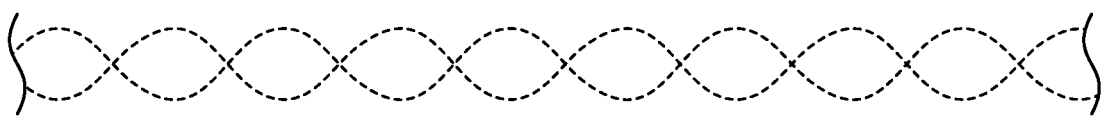
FIG. 8B
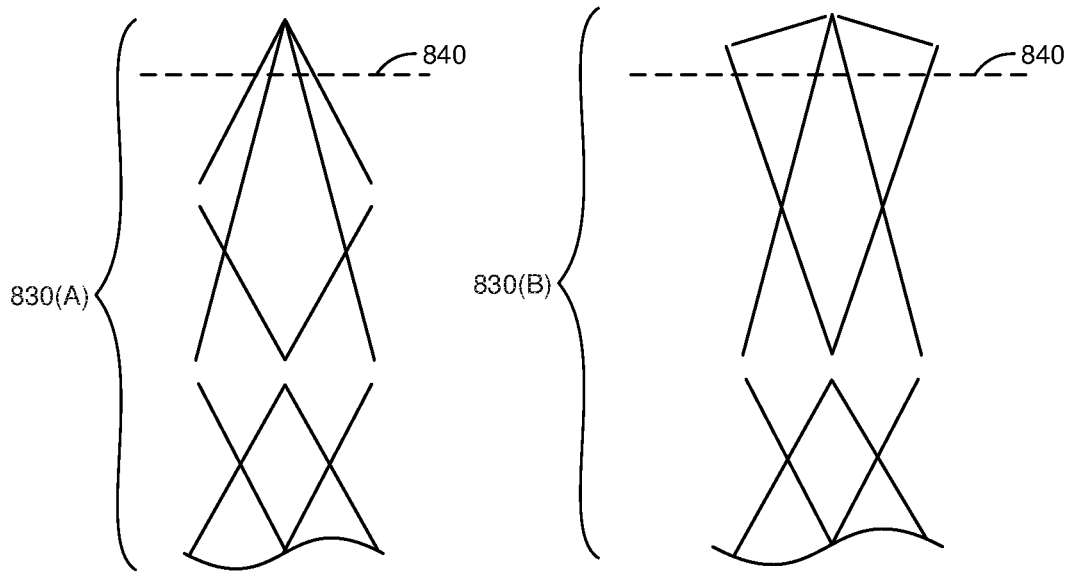
FIG. 8C          FIG. 8D

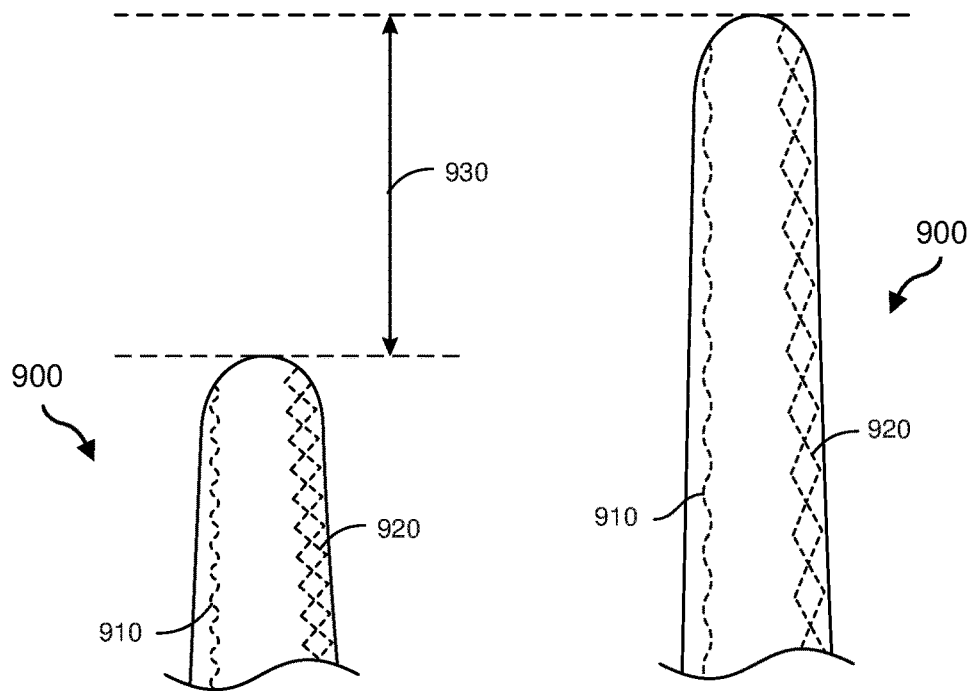
FIG. 9A  FIG. 9B
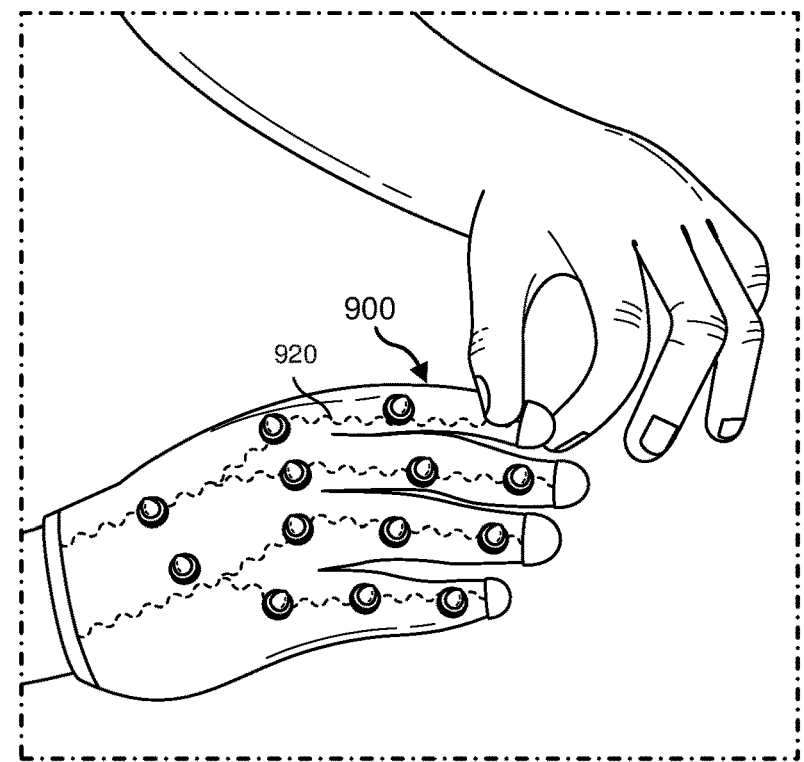
FIG. 10

SYSTEMS AND METHODS FOR STRAIN RELIEF IN A WEARABLE APPARATUS

CROSS-REFERENCE TO RELATED APPLICATION

This application claims priority to and the benefit of U.S. Provisional Application No. 62/736,491, which was filed on 26 Sep. 2018 and is titled "SYSTEMS AND METHODS FOR STRAIN RELIEF IN A WEARABLE APPARATUS." The entire contents of this provisional application are incorporated herein by reference.

BACKGROUND

Clothing items often include elastic materials to provide comfort and an accommodating fit for users. Some wearable electronic devices ("wearables") may also include elastic materials, but traditional materials used in clothing may not be ideal for use in certain wearable applications. For example, wiring run through a portion of a wearable, and using a traditional elastic material for a wired portion of a wearable may leave the wiring vulnerable to damage or disconnection if the elastic material stretches beyond a length of the wiring.

SUMMARY

As will be described in greater detail below, the instant disclosure describes systems and methods for using stitching to provide strain relief in a wearable apparatus. For example, wearable apparatus may include (1) a deformable material that is dimensioned to conform to a body part of a user and configured to stretch in at least one direction, (2) a transducer coupled to the deformable material, (3) a conduit that extends along the deformable material in the at least one direction and that couples the transducer to a control system, and (4) stitching in the deformable material that restricts the deformable material from stretching farther than the conduit is configured to extend.

The wearable apparatus may be configured in a variety of ways. For example, the deformable material may form all or a portion of a glove. In this example, the wearable apparatus may also include a tab that is coupled to the stitching and dimensioned for use in doffing the glove. In some embodiments, the stitching may include a first segment extending along a first digit of the glove, a second segment extending along a second digit of the glove, and a third segment that is coupled to the first and second segments and that extends toward a wrist section of the glove.

The wearable apparatus may also include any suitable type of transducer. For example, the wearable apparatus may include one or more haptic feedback transducers (e.g., a vibrotactile transducer) and/or tactile sensors. In such embodiments, the conduit that couples the transducer to the control system may include a conductive wire. In other examples, the transducer may be a fluidic device and the conduit may be a fluidic channel (e.g., a tube).

The stitching may be dimensioned or patterned in a variety of ways. For example the stitching may include a period pattern, such as a zig-zag pattern or a sinusoidal pattern. Additionally or alternatively, the period of the stitching may be greater than 1 mm and/or less than 3 mm. In some embodiments, the stitching may be made from a stitching material having an elastic modulus that is less than an elastic modulus of the deformable material in the at least one direction.

In some examples, the wearable apparatus be coupled to a head-mounted display. In such examples, the control system may be programmed to coordinate information provided at the transducer with information provided at the head-mounted display.

In addition, a method of manufacturing a wearable device may include (1) dimensioning a deformable material to conform to a body part of a user, (2) attaching a transducer to the deformable material, (3) coupling the transducer to a control system via a conduit that extends along the deformable material in a direction in which the deformable material stretches, and (4) creating, using a stitching material, a stitching in the deformable material that restricts the deformable material from stretching farther than the conduit is configured to extend.

This disclosure also discusses an artificial reality system having a head-mounted display and a glove. The glove may include (1) a deformable material that is dimensioned to conform to a body part of a user and configured to stretch in at least one direction, (2) a transducer coupled to the deformable material, (3) a conduit that extends along the deformable material in the at least one direction, and (4) stitching in the deformable material that restricts the deformable material from stretching farther than the conduit is configured to extend. The artificial reality system may also include an artificial-reality control system that is communicatively coupled to the head-mounted display and that is also communicatively coupled, via the conduit, to the transducer. The artificial reality system may also be programmed to coordinate information provided at the transducer with information provided at the head-mounted display to provide an artificial reality experience to the user.

In some embodiments, the head-mounted display comprises a virtual reality display that at least substantially covers a user's field-of-view. The head-mounted display may also be an augmented reality display through which the user has a view of both real-world surroundings and a virtual world.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 8A shows an exemplary stitching pattern for reducing strain in soft goods.

FIG. 8B shows another exemplary stitching pattern for reducing strain in soft goods.

FIG. 8C shows standard stitching at a seamline.

FIG. 8D shows anchored stitching at a seamline according to embodiments of this disclosure.

FIGS. 9A and 9B show a stitching in a relaxed state when a wearable is being worn and in a stretched state as the wearable is being doffed.

FIG. 10 shows an example of a user doffing a glove with exemplary stitching and tabs.

Figure 1:
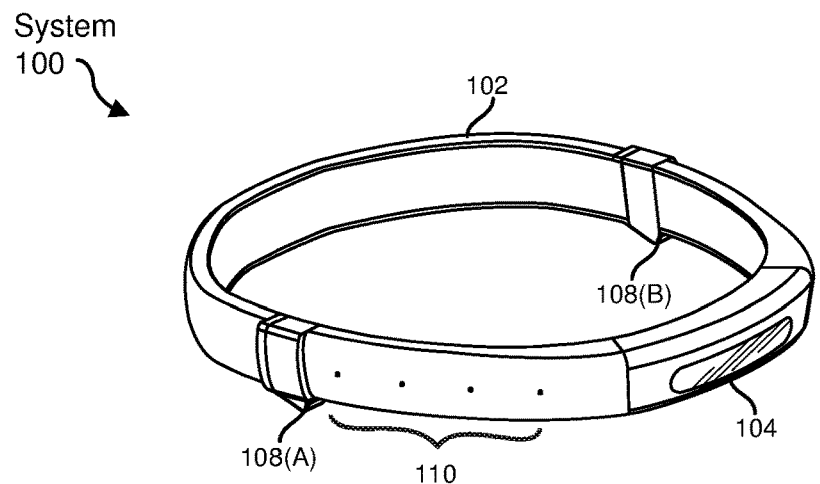
FIG. 1 shows a perspective view of an exemplary artificial reality band.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

One option to accommodate stretching in wearable materials may be to include sufficient slack in the conduit to allow for a conduit to extend with the material. Unfortunately, this approach may have one or more drawbacks, especially since some materials may stretch significantly (e.g., up to 50 percent or more) to provide the desired level of fit and/or flexibility. For example, weight is often a significant design consideration for wearable devices, and adding extra conduit may make it difficult to hit design targets. In systems that use wiring, excessive lengths of wire may present wire management challenges (e.g., wires can snag or become tangled). And adding significant lengths of extra conduit may not be feasible for some types of conduit (e.g., fluidics channels).

Another approach to address stretching in wearable materials may be to add a relatively inelastic stitching in a direction of anticipated pull or strain. As will be explained in greater detail below, using this type of stitching as a strain relief may allow for use of shorter conduit, may make wire management easier, may protect wiring and electronic devices coupled to the wiring, and/or may provide a number of other advantages.

Figure 2:
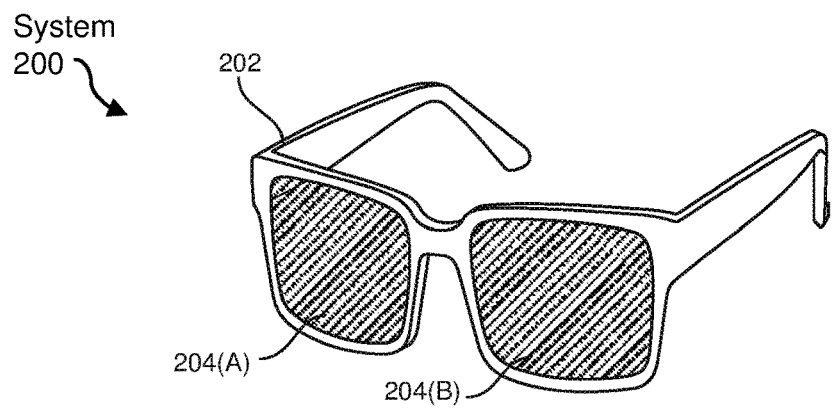
FIG. 2 shows a perspective view of exemplary artificial reality eyewear.
Figure 3:
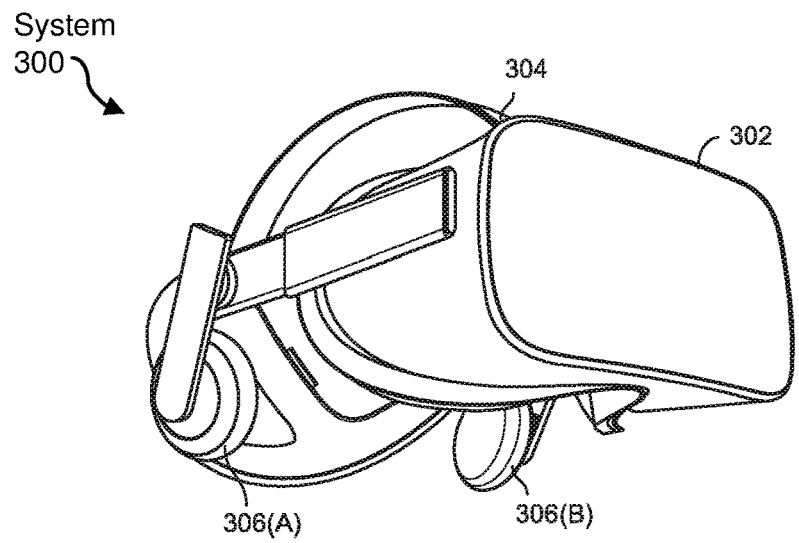
FIG. 3 shows a perspective view of an exemplary virtual reality headset.
Figure 4:
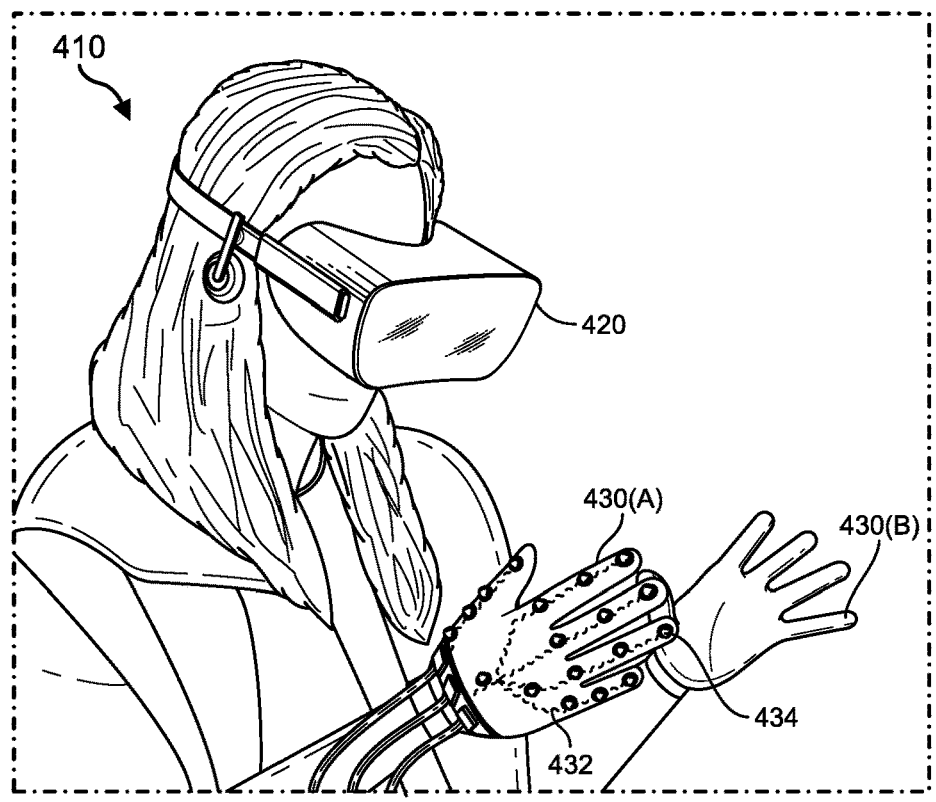
FIG. 4 shows a virtual reality headset being used in combination with a pair of virtual reality gloves.
Figure 5:
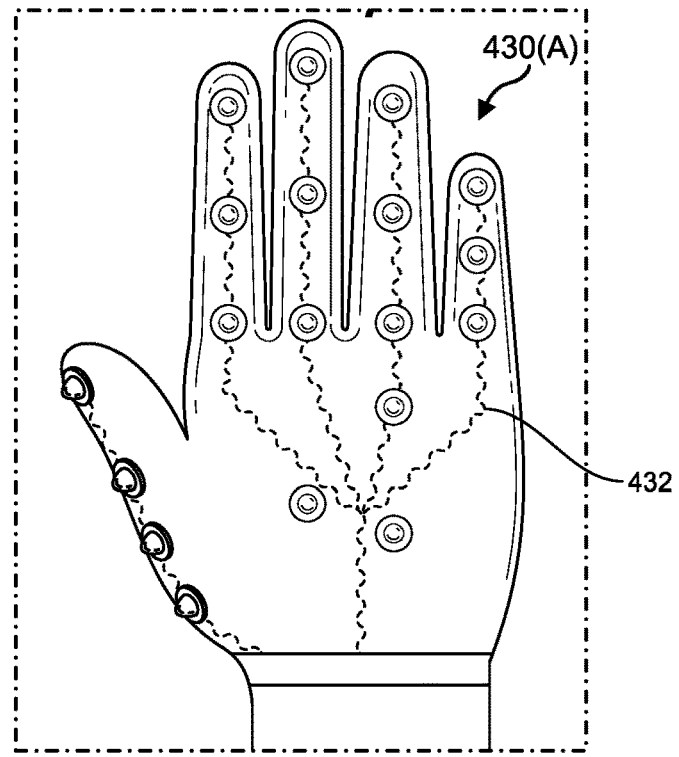
FIG. 5 shows a front view of an exemplary artificial reality glove having a stitching pattern with branches that connect at a trunk.

The following will provide, with reference to FIGS. 1-3, a discussion of exemplary artificial reality systems. FIGS. 4 and 5 and the corresponding description discuss artificial reality gloves and stitching that may be used to protect wiring in the gloves, and the description corresponding to FIG. 7 explains how a tab may be attached to the stitching to facilitate doffing the gloves. Examples of stitching patterns are discussed in connection with FIGS. 8A, 8B, 8C, and 8D, and examples of how these stitching patterns may protect wiring in gloves and other soft goods are presented in the discussion of FIGS. 9 and 10. The following will also provide, with reference to FIG. 11, an exemplary method for manufacturing soft goods with the stitching described herein.

Turning to FIGS. 1-3, embodiments of the instant disclosure may include or be implemented in conjunction with various types of artificial reality systems. Artificial reality is a form of reality that has been adjusted in some manner before presentation to a user, which may include, e.g., a virtual reality (VR), an augmented reality (AR), a mixed reality (MR), a hybrid reality, or some combination and/or derivative thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs), an example of which is AR system 100 in FIG. 1. Other artificial reality systems may include an NED that also provides visibility into the real world (e.g., AR system 200 in FIG. 2) or that visually immerses a user in an artificial reality (e.g., VR system 300 in FIG. 3). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

AR system 100 generally represents a wearable device dimensioned to fit about a body part (e.g., a head) of a user. As shown in FIG. 1, system 100 may include a frame 102 and a camera assembly 104 that is coupled to frame 102 and configured to gather information about a local environment by observing the local environment. AR system 100 may also include one or more audio devices, such as output audio transducers 108(A) and 108(B) and input audio transducers 110. Output audio transducers 108(A) and 108(B) may provide audio feedback and/or content to a user, and input audio transducers 110 may capture audio in a user's environment.

As shown, AR system 100 may not necessarily include an NED positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While AR system 100 may not include an NED, AR system 100 may include other types of screens or visual feedback devices (e.g., a display screen integrated into a side of frame 102).

The embodiments discussed in this disclosure may also be implemented in AR systems that include one or more NEDs. For example, as shown in FIG. 2, AR system 200 may include a frame 202 configured to hold a left display device 204(A) and a right display device 204(B) in front of a user's eyes. Display devices 204(A) and 204(B) may act together or independently to present an image or series of images to a user. While AR system 200 includes two displays, embodiments of this disclosure may be implemented in AR systems with a single NED or more than two NEDs. AR system 200 may also include one or more input or output audio transducers (not shown).

As noted, some artificial reality systems may, instead of blending an artificial reality with actual reality, substantially replace one or more of a user's sensory perceptions of the real world with a virtual experience. One example of this type of system is a head-worn display system, such as VR system 300 in FIG. 3, that mostly or completely covers a user's field of view. VR system 300 may include a front rigid body 302 and a band 304 shaped to fit around a user's head. VR system 300 may also include output audio transducers 306(A) and 306(B). Furthermore, while not shown in FIG. 3, front rigid body 302 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in AR system 200 and/or VR system 300 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in AR system 200 and/or VR system 300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, AR system 100, AR system 200, and/or VR system 300 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 1 and 3, output audio transducers 108(A), 108(B), 306(A), and 306(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 110 may include condenser microphones, dynamic microphones, ribbon microphones, and/or any other type or form of input transducer. In some embodiments, a single transducer may be used for both audio input and audio output.

While not shown in FIGS. 1-3, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

Strain-relief stitching may be used in any of the artificial reality devices discussed in FIGS. 1-3. While the following discussion focuses on using strain-relief stitching in gloves, strain-relief stitching may also be used in headbands, headsets, shirts, pants, socks, watchbands, chest bands, arm bands, and/or any other type or form of artificial reality wearable where limiting strain on a deformable material may protect conduit or other devices. The term "deformable material" generally refers to any type or form of material that may stretch or otherwise change shape under stress. Examples of deformable materials include knit fabrics (e.g., jerseys, rayon blends, mesh knits, etc. Such wearable systems may include various types of deformable materials, including knit fabrics, spandex, spandex blends (e.g., nylon spandex, rayon knit spandex, stretch denim, cotton poplin stretch), rubber, power mesh, etc.

Turning to FIG. 4, a user 410 may experience a virtual reality via a virtual reality headset 420, virtual reality gloves 430(A) and 430(B), and/or one or more other components (e.g., an external computing system or console). For example, a computing system may function as a controller that is communicatively coupled to headset 420 and gloves 430(A) and 430(*b*) and may coordinate communication among these devices to provide a virtual reality experience to user 410.

Virtual reality gloves 430(A) and 430(B) may include any number of transducers, such as transducer 434 on virtual reality glove 430(A). Various types of transducers (e.g., devices that convert energy from one form to another) may be attached to the wearables discussed in this disclosure. For example, a wearable may include one or more sensors (i.e., transducers that respond to signals or stimuli), actuators (e.g., transducers that move or control a mechanism or system), and/or bidirectional transducers that can function as both sensor and actuators. The wearable apparatus is communicatively coupled to a head-mounted display system; and the control system is programmed to coordinate information provided at the transducer with information provided at the head-mounted display.

Examples of wearable sensors include positioning sensors (e.g., GPS sensors, triangulation systems, etc.), vision and depth optical sensors (e.g., 3D imaging and motion capture sensors, stereoscopic vision sensors, time of flight sensors, structured light sensors, two-dimensional cameras, etc.), heart-rate monitors (e.g., photoplethysmography (PPG) sensors), electrodes (e.g., ECG electrodes, EEG electorodes, EMG electrodes, heart-rate monitoring electrodes, galvanic skin response electrodes, etc.), temperature sensors, inertial measurement units (e.g., micro electromechanical (MEMS) accelerometers, mems gyroscopes, compasses, magnetometers, MEMS barometers, pressure sensors, etc.), tactile sensors (e.g., resistive force sensors, dielectric elastomer electroactive polymers, textile-based pressure sensing, capacitive pressure sensors, etc.), microphones (e.g., MEMs microphones, moving-coil microphones, ribbon microphones, etc.), chemical sensors, gas sensors, and/or any other suitable type or form of sensor.

Examples of wearable actuators include, among others, electrotactile stimulators, vibrotactile transducers, and ultrasound stimulators. Electrotactile stimulators may use direct electrical stimulation to simulate texture, pressure, pain, etc. For example, an electrotactile stimulator may send microamperre-level current through a user's skin to simulate texture of a surface. Alternatively, vibrotactile transducers may apply physical pressure to the skin to simulate interaction with the real world. Examples of vibrotactile transducers include eccentric mass motors, linear actuators, fluidics devices, and various other types of transducers.

Actuators and sensors may be coupled to a control system via a variety of types of conduits, which may be placed on an inside surface of a wearable, an outside surface of a wearable, and/or integrated within a wearable material. Examples of conduits include electrical wires, mechanical cables, protective sheaths, fluidic tubing, conductive traces, flexible circuits, and any other type or form of conduit that communicatively couples a transducer to a control system. As noted, these conduits may be protected by stitching (e.g., stitching 432 in glove 430(A) that may restrict or inhibit a wearable material from deforming in a manner that may compromise the integrity of the conduits.

Strain-relief stitching may be implemented using various materials, stitching patterns, and stitching configurations. Examples of materials that may be used for strain-relief stitching include silk thread, wool thread, cotton thread, polyester threat, metallic threat, cotton-poly thread, monofilament thread, etc. The stitching may be relatively inelastic (e.g., may have a lower elastic modulus that the material into which it is being stitched) or may be somewhat elastic. The stitching may be configured to run in a direction of a conduit and may be stitched over the conduit, under the conduit, alongside the conduit, around the conduit, across the conduit, and/or in any other configuration that provides strain-relief for the conduit.

Figure 6:
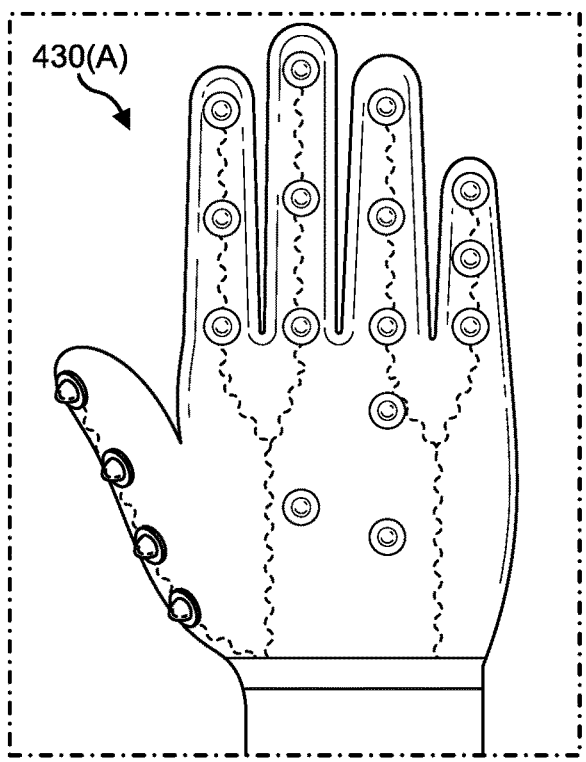
FIG. 6 shows another configuration of a stitching pattern in an artificial reality glove.

In some examples, the stitching may extend from a transducer to a boundary of a soft-goods material. For example, as shown in FIGS. 5 and 6, stitching 432 may extend from transducers at the fingertips of glove 430(A) to a wrist region of glove 430(A). In some examples, two or more branches of stitching may be combined into a single branch or trunk to reduce the time and/or cost involved in creating the stitching and/or to control deformation caused by pulling or moving a soft goods material. FIG. 5 shows an example where branches of stitching from each finger are combined into a single trunk that extends to a wrist area of glove 430(A). FIG. 6 shows an example where branches of stitching from the index and middle finger are combined into a first branch and stitching from the pinkie and ring finger are combined into a second branch, with the first and second branches combining into a trunk that extends to the wrist region of glove 430(A). Stress-relief stitching may also be implemented using various other branching patterns.

Figure 7:
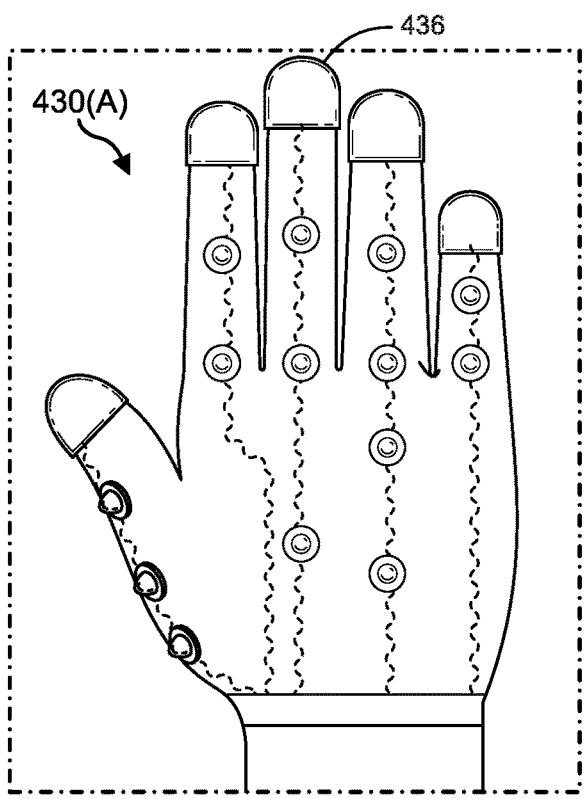
FIG. 7 shows a front view of an exemplary artificial reality glove with pull tabs connected to the stitching to aid in doffing the glove.

Some wearable devices may be configured with stitching that is coupled to a material that is less flexible than a primary material of a soft good to provide a surface that a user may pull when donning or doffing a wearable. By providing a less-flexible material that is coupled to stitching, embodiments of this disclosure may further reduce the risk that pulling on a flexible material will damage a conduit. For example, as shown in FIG. 7, glove 430(A) may include fingertip tabs or covers 436 that are less flexible than the rest of the finger material. These tabs may be coupled to stitching 432 in a manner that causes a pulling force on tab 436 to transfer to act on stitching 432 such that stitching 432 limits an amount of extension caused by the pulling force.

A wearable that has different elasticity in different parts may be formed using different materials or by using different weave patterns or materials. For example, a glove may be formed using an anisotropic weave pattern to yield different stiffnesses in different sections. Anisotropic materials may have directionally dependent properties and may, therefore, exhibit different properties when oriented in different directions. For example, an anisotropic material may have greater rigidity when horizontally oriented relative to a reference point than when vertically oriented relative to the reference point.

Different orientations of a weave pattern of an anisotropic material may cause different portions of the wearable to have different elastic moduli. For example, portions of a material having a stiff weave may correspond to stiff areas of a user's hand, while portions of the material having a softer weave correspond to soft areas of the user's hand. The positioning of stiffly woven portions of the material and softly woven portions of a material may enable a glove to constrain movement of the stiff areas of the user's hand while affording the user a larger range of motion for soft areas of the user's hand while wearing the glove 205. The positing of materials of different stiffness and elasticity may also facilitate strain relief for conduits within the glove or within any other wearable.

The stitching may be formed in periodic patterns, as shown in FIGS. 8A and 8B. For example, FIG. 8A shows stitching a zig-zag pattern 810, which may be sewn quickly and efficiently, and FIG. 8B shows a sinusoidal pattern 820. Various other types of stitches may also be used, including overcast stitches, reinforced stitches, double-needle stitches, triple-needle stitches, multi-stitch zig-zags, serpentine stitches, overlock stitches, hem stitches, etc. The stitches may be any suitable width and/or may have any suitable period between patterns. In some embodiments, a period of a stitch pattern may be greater than 1 mm and less than 3 mm (e.g., 2 mm). In general, the width and/or length of a stitching pattern may determine how much stretch a stitch will allow, and these parameters may be designed to control or restrict strain within predetermined thresholds. Furthermore, in some embodiments, bobbin and top tension of a sewing device may need to be balanced such that neither is too tight, which may reduce the ability of a stitch to stretch. Embodiments of the present disclosure may also use multiple rows of stitches. For example, stitching may be applied along either side of a conduit to provide additional strain relief.

Some embodiments may involve anchoring a stitching pattern at a seamline, as discussed with reference to FIGS. 8C and 8D. A stitch path 830(A) may be terminated at a seamline 840 in the manner shown in FIG. 8C. In contrast, some embodiments of this disclosure may create a modified stitch path 830(B) that terminates at seamline 840 in the manner shown in FIG. 8D to provide anchoring for the stitching that facilitates the strain lock properties of the stitching. For example, the stitching patterns described herein may be intentionally caught in fourchette seams and/or in stabilizing lace of a glove.

As noted, strain-relief stitching may restrict a deformable material from stretching farther than a conduit is configured to extend to prevent damage to the conduit and/or to protect the conduit from becoming disconnected from a transducer, a circuit board, or the like. FIG. 9 shows a digit 900 of a glove in a resting position. Digit 900 may include a conduit (e.g., an electrical wire) 910 and stitching 920. When digit 900 is pulled, stitching 920 may allow digit 900 to extend no farther than distance 930 to the extended position shown in FIG. 9B. In the extended position, conduit 910 may still be protected from overextension stress. FIG. 10 shows an example of digit 900 being pulled at a tab coupled to stitching 920, as discussed in greater detail in connection with FIG. 7.

Figure 11:
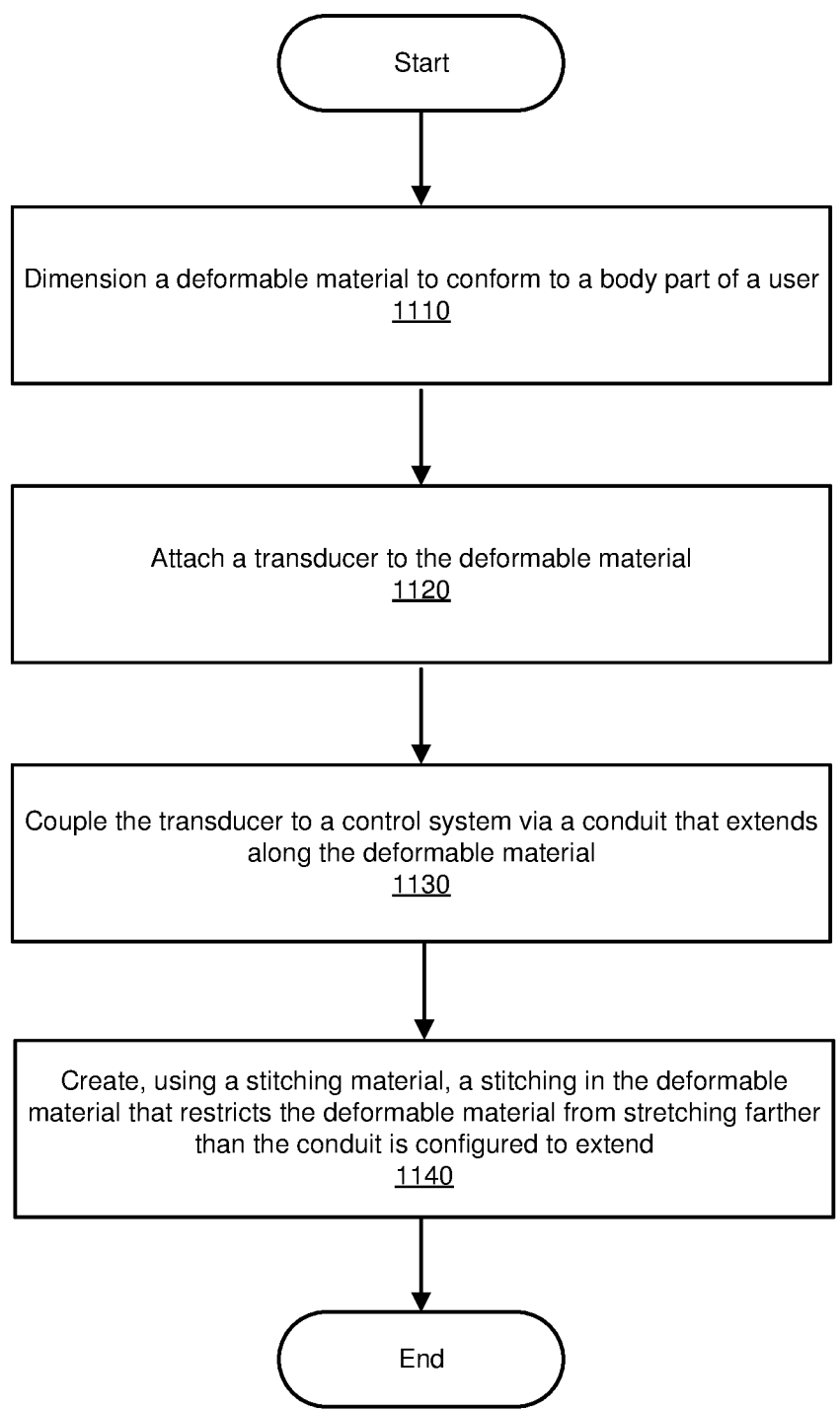
FIG. 11 is a flow diagram of a method of manufacturing wearables with stitching that protects wiring and/or other conduits in the wearables.

FIG. 11 illustrates a method of manufacturing a wearable device with strain-relief stitching. At step 1110, a deformable material may be dimensioned to conform to a body part of a user. The deformable material may be dimensioned in any suitable fabrication mechanism or process. Furthermore, the deformable material may be configured to conform to a body part of a user (e.g., a hand, a foot, an arm, a leg, a head, a torso, etc.) and may form all or a portion of an article of clothing used for a wearable device, a wearable strap, and/or any other soft goods application.

At step 1120, the transducer may be attached to the deformable material by, for example, stitching, adhesive, or any other suitable attachment mechanism. At step 1130, the transducer may be coupled to a control system via a conduit that extends along the deformable material in a direction in which the deformable material is configured to stretch, and a at step 1140 a stitching may be created in the deformable material to restrict the deformable material from stretching farther than the conduit may be configured to extend. The stitching may be formed in any suitable manner. For example, the stitching may be formed by machine sewing, hand sewing, three-dimensional printing, etc.

In examples where the deformable material is part of a glove, the stitching may be attached to a tab that is positioned for use in doffing the glove. The stitching may also include a first segment extending along a first digit of the glove, a second segment extending along a second digit of the glove, and a third segment that is coupled to the first and second segments and that extends toward a wrist section of the glove.

Stitching segments may be interconnected and/or used independently to protect both simple and complex conduit systems. Some conduit systems may involve simple wiring between two points, and a single segment of strain-relief stitching between these points may be used to protect the system. Other systems may involve complex electrical interconnections between multiple sensors, controllers, and other electronic components. Interconnected branches and/or meshes of stitching may be used to protect such systems.

In addition to protecting electrical systems, embodiments of the present disclosure may protect fluidic systems. For example, various wearable devices may include fluidic transducers interconnected with other fluidic devices to form a composite fluidic system. In some examples, the composite fluidic system may function analogously to an electronic device (e.g., that includes and/or operates as a fluidic field effect transistor, a fluidic diode, a fluidic resistor, a fluidic capacitor, etc.). In one such example, a fluidic device may function as a fluidic logic device (e.g., an inverter, OR gate, etc.) in tandem with other fluidic logic devices, forming a fluidic circuit in which fluid flow in one fluidic logic device controls the fluid flow of other fluidic logic devices. In some examples, multiple fluidic circuits may be combined in a form of large scale integration (LSI). In one such example, a fluidic LSI system may be used as a haptic assembly in a wearable device (e.g., in an artificial reality system). In these examples, composite fluidic devices may operate as part of a variety of haptic components within the haptic assembly, such as a controller, an actuator, and/or a sensor. Each of these fluidic devices may be interconnected with fluidic channels that may be protected by the strain-relief stitching described herein.

By providing stitching that protects overstretching soft goods that contain fluidic channels, electrical wires, or other conduits, embodiments of the present disclosure may facilitate improved end-user experiences with an artificial reality system. Embodiments of the present disclosure may also help product designers meet weight specifications, reduce wire management issues, and/or may provide a number of other features and advantages over prior systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A wearable apparatus comprising:
a deformable material that is dimensioned to conform to a body part of a user and configured to stretch in at least one direction;
a transducer coupled to the deformable material;
a conduit that extends along the deformable material in the at least one direction and that couples the transducer to a control system; and
stitching in the deformable material along the conduit that restricts the deformable material from stretching farther than the conduit is configured to extend.

2. The wearable apparatus of claim 1, wherein the deformable material comprises a glove.

3. The wearable apparatus of claim 2, further comprising a tab that is coupled to the stitching and dimensioned for use in doffing the glove.

4. The wearable apparatus of claim 2, wherein the stitching comprises:
a first segment extending along a first digit of the glove;
a second segment extending along a second digit of the glove; and
a third segment that is coupled to the first and second segments and that extends toward a wrist section of the glove.

5. The wearable apparatus of claim 1, wherein:
the transducer comprises at least one of:
a haptic feedback transducer; or
a tactile sensor; and
the conduit comprises a conductive wire.

6. The wearable apparatus of claim 5, wherein the haptic feedback transducer comprises a vibrotactile transducer.

7. The wearable apparatus of claim 1, wherein:
the transducer comprises a fluidic transducer; and
the conduit comprises a fluidic channel.

8. The wearable apparatus of claim 1, wherein the stitching comprises a periodic pattern.

9. The wearable apparatus of claim 8, wherein a period of the periodic pattern is greater than 1 mm and less than 3 mm.

10. The wearable apparatus of claim 1, wherein the stitching comprises a stitching material having an elastic modulus that is less than an elastic modulus of the deformable material in the at least one direction.

11. The wearable apparatus of claim 1, wherein:
the wearable apparatus is communicatively coupled to a head-mounted display system; and
the control system is programmed to coordinate information provided at the transducer with information provided at the head-mounted display.

12. A method of manufacturing a wearable device, the method comprising:
dimensioning a deformable material to conform to a body part of a user, wherein the deformable material is configured to stretch in at least one direction;
attaching a transducer to the deformable material;
coupling the transducer to a control system via a conduit that extends along the deformable material in the at least one direction; and
creating, using a stitching material, a stitching in the deformable material along the conduit that restricts the deformable material from stretching farther than the conduit is configured to extend.

13. The method of claim 12, wherein:
the deformable material comprises a glove; and
the control system comprises an artificial reality system.

14. The method of claim 13, further comprising securing a tab to the stitching, wherein the tab is dimensioned for use in doffing the glove.

15. The method of claim 13, wherein the stitching comprises:
a first segment extending along a first digit of the glove;
a second segment extending along a second digit of the glove; and
a third segment that is coupled to the first and second segments and that extends toward a wrist section of the glove.

16. The method of claim 12, wherein:
the transducer comprises at least one of:
a haptic feedback transducer; or
a tactile sensor; and
the conduit comprises a conductive wire.

17. The method of claim 12, wherein:
the transducer comprises a fluidic transducer; and
the conduit comprises a fluidic channel.

18. An artificial reality system comprising:
a head-mounted display;
a glove comprising:
a deformable material that is dimensioned to conform to a body part of a user and configured to stretch in at least one direction;
a transducer coupled to the deformable material;
a conduit that extends along the deformable material in the at least one direction; and
stitching in the deformable material along the conduit that restricts the deformable material from stretching farther than the conduit is configured to extend; and
an artificial-reality control system that:
is communicatively coupled to the head-mounted display;
is communicatively coupled, via the conduit, to the transducer; and
is programmed to coordinate information provided at the transducer with information provided at the head-mounted display to provide an artificial reality experience to the user.

19. The artificial reality system of claim 18, wherein the head-mounted display comprises a virtual reality display that at least substantially covers a user's field-of-view.

20. The artificial reality system of claim 18, wherein the head-mounted display comprises an augmented reality display through which the user has a view of both real-world surroundings and a virtual world.

* * * * *